United States Patent [19]

Hari

[11] Patent Number: 4,984,979
[45] Date of Patent: Jan. 15, 1991

[54] DOUGH LEVELLER/TURNTABLE DEVICE

[76] Inventor: Beverley A. Hari, Box 6028, Station A, Calgary, Alberta T2H 2L3, Canada

[21] Appl. No.: 409,404

[22] Filed: Oct. 16, 1989

[51] Int. Cl.⁵ .................. B29C 43/02; A21C 3/02
[52] U.S. Cl. .................. 425/374; 425/263; 7/111
[58] Field of Search .......... 425/374, 263, 266; 7/111

[56] References Cited

U.S. PATENT DOCUMENTS

| | | | |
|---|---|---|---|
| 527,476 | 10/1894 | Bonta | 425/374 |
| 1,452,742 | 4/1923 | Johnston | 425/374 |
| 1,642,062 | 9/1927 | Diaz | 425/374 |
| 2,521,982 | 9/1950 | Kors | 425/374 |
| 4,009,857 | 3/1977 | Delmas | 425/374 |
| 4,266,923 | 5/1981 | Curnes | 425/374 |
| 4,808,104 | 2/1989 | D'Orlando | 425/374 |

Primary Examiner—Willard Hoag
Attorney, Agent, or Firm—George Haining Dunsmuir

[57] ABSTRACT

A dough working device includes a rectangular body with a recess in the top surface thereof for receiving dough to be rolled; a plurality of thin plates for insertion into the recess for changing the depth thereof and consequently the thickness of the dough; a second, circular recess in the bottom surface of the body for carrying a turntable; a plug normally carried in a well in one side of the body for insertion into a well in the circular recess when the body is inverted for rotatably supporting the turntable; and a rubber pad supporting the body in either the dough rolling or turntable position.

8 Claims, 1 Drawing Sheet

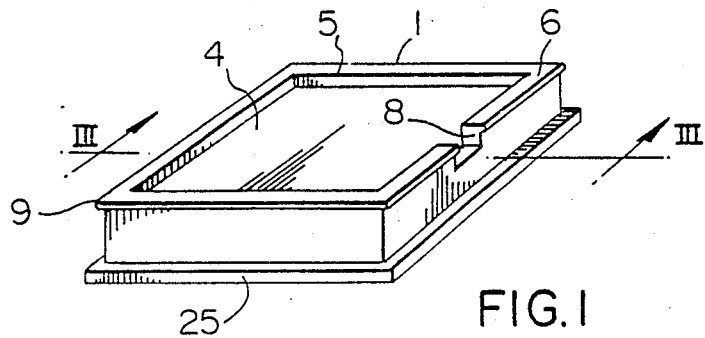
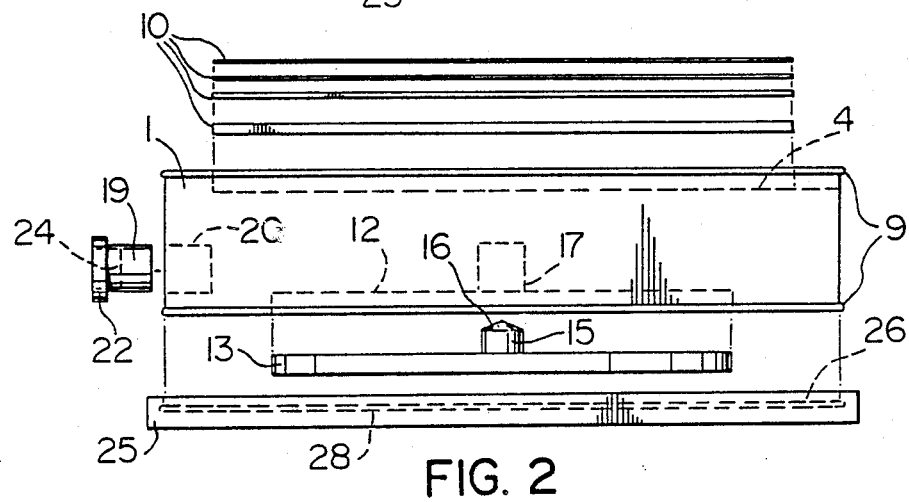
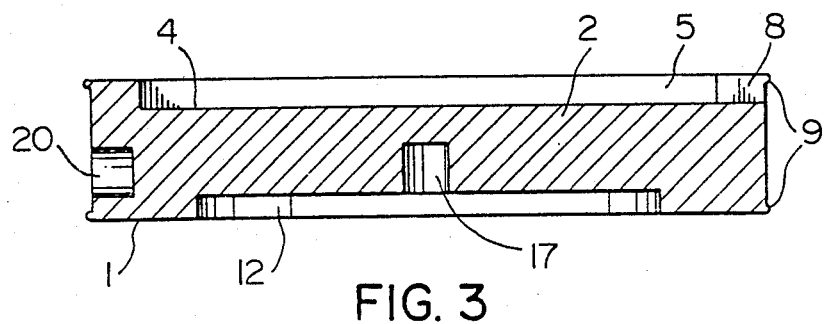

DOUGH LEVELLER/TURNTABLE DEVICE

BACKGROUND OF THE INVENTION

This invention relates to a food processing device, and in particular to a dough working device.

Usually, dough is rolled using a rolling pin or other cylindrical object on any flat surface such as a kitchen counter or cutting board. While the conventional method is simple and effective, the resulting product is not necessarily of uniform thickness. Moreover, a separate implement is required when applying icing to a food product, or when decorating the product.

The object of the present invention is to provide a relatively simple dough working device, which ensures uniform dough thickness, and which facilitates other work such as decorating a food product.

BRIEF SUMMARY OF THE INVENTION

Accordingly, the present invention relates to a dough working device comprising body means; first recess means in a top surface of said body means for receiving dough to be rolled, second recess means in a bottom surface of said body means, turntable means normally carried by said second recess means in a stored position; and plug means for insertion into said second recess means for rotatably supporting said turntable means in a use position when the body means is inverted.

While the device is described as a dough working device, it will be appreciated that the turntable feature of the invention makes the device suitable for use in the decoration or other processing of food products. For example, the turntable is useful when applying icing to a cake.

BRIEF DESCRIPTION OF THE DRAWINGS

The invention will be described in greater detail with reference to the accompanying drawing, which illustrates a preferred embodiment of the invention, and wherein:

FIG. 1 is a perspective view from above of a dough working device in accordance with the present invention;

FIG. 2 is an exploded, side elevational view of the device of FIG. 1; and

FIG. 3 is a cross section taken generally along line III—III of FIG. 1, with parts omitted.

DESCRIPTION OF THE PREFERRED EMBODIMENT(S)

With reference to FIG. 1, the dough working device of the present invention includes a rectangular body 1 with a solid core 2. A rectangular recess 4 is provided in the top of the body 1, with a raised border or wall 5 therearound, i.e. around the periphery of the top of the body. The wall 5 has a planar top surface 6 for supporting a roller (not shown) such as a rolling pin. A gap 8 is provided in one side of the walls for discharging excess dough. Convex flanges 9 or beads extend around the outer peripheries of the bottom of the body 1 and the top of the wall 5. A plurally of plates 10 (FIG. 2) having a variety of thicknesses are provided with the body 1. The plates 10 are used to change the depth of the recess 4. The plates 10 are inserted and removed manually.

A disc-shaped recess 12 is provided in the bottom centre of the body 1 for receiving a disc-shaped plate or turntable 13. The turntable 13 is normally inserted into the recess 12, i.e. carried completely thereby in a stored position with the bottom surface of the body 1. A post 15, with a pointed outer end 16, on the centre of the turntable 13 extends into an upwardly extending, central well 17 in the recess 12. A cylindrical plug 19 for rotatably supporting the post 15 and the turntable 13 is normally housed in a cylindrical well 20 in one side of the body 1. The plug 19 has an angular flange 22 on the outer end thereof for limiting insertion of the plug into the wells 17 and 20, and for facilitating removal thereof from such wells. A recess 24 in the outer end of the plug 19 receives the post 15 when the plug 19 is positioned in the well 17.

The body 1, the plates 10, the turntable 13 and the plug 19 are carried by a rectangular, rubber pad 25 (FIGS. 1 and 2). The pad 25 is flexible and has a top recess 26 approximately equal in length and width to the body 1. A concave bottom end 28 of the recess 26 receives the beaded top or bottom end of the body 1, i.e. one of the flanges 9.

During use, for working dough, the body 1 is placed on a flat surface with the recess 4 opening upwardly, with or without one or more of the plates 10, depending upon the thickness of the dough. The dough is placed in the recess 4 and a rolling pin or other cylindrical implement (not shown) is rolled along opposed, parallel side walls 5 to flatten the dough. Excess dough can escape through the gap 8 in the wall 5.

When the device is to be used as a turntable, the body 1 is reversed in the pad 25, so that the recess 23 opens upwardly. The turntable 13 is removed from the recess 12. The plug 19 is removed from the well 20 and placed in the well 17, and the turntable 12 is placed over the recess 12 so that the post 15 enters the recess 24. The device is ready for use as a turntable for decorating or other purposes.

It will be appreciated that the device described herein can be used to roll materials other than dough such as pizza crusts.

What I claim is:

1. A dough working device comprising body means; first recess means in a top surface of said body means for receiving material to be rolled, second recess means in a bottom surface of said body means, turntable means normally carried by said second recess means in a stored position; and plug means for insertion into said second recess means for rotatably supporting said turntable means in a use position when the body means is inverted.

2. A device according to claim 1, wherein said first recess means is defined by wall means extending around the periphery of the top of said body means; and a gap in said wall means permitting the escape of excess rolled material from said first recess means.

3. A device according to claim 1, wherein said second recess means includes central, first well means for receiving said plug means during conversion of the device into a turntable.

4. A device according to claim 3, including second well means in one side of said body means for storing said plug means when the device is being stored or used for rolling material.

5. A device according to claim 1, including a plurality of thin plate means for insertion into said first recess means for altering the depth thereof and consequently the thickness of material rolled therein.

6. A device according to claim 5, wherein said plate means are of varying thickness.

7. A device according to claim 1, including pad means for supporting said body means in the material rolling or inverted, turntable use positions.

8. A device according to claim 7, including flange means defining beaded top and bottom ends on said body means; and a complementary beaded edge receiving recess in said pad means for stabilizing said body means in either the material rolling or turntable position.

* * * * *